United States Patent [19]
Pater

[11] Patent Number: 5,873,473
[45] Date of Patent: Feb. 23, 1999

[54] RELEASE MECHANISM FOR CARTS, PALLETS OR UNIT LOAD STORAGE SYSTEMS

[75] Inventor: John F. Pater, Northbrook, Ill.

[73] Assignee: Konstant Products, Inc., Skokie, Ill.

[21] Appl. No.: 932,820

[22] Filed: Sep. 16, 1997

[51] Int. Cl.⁶ .................................................. A47F 5/00
[52] U.S. Cl. ...................... 211/183; 211/151; 211/59.2; 414/276; 312/201
[58] Field of Search .................................... 211/59.2, 151, 211/162, 183; 414/276, 286; 312/198, 201

[56] References Cited

U.S. PATENT DOCUMENTS

| | | | |
|---|---|---|---|
| 4,197,047 | 4/1980 | Haldimann | 414/276 |
| 4,523,794 | 6/1985 | Peterman | 312/201 |
| 4,607,896 | 8/1986 | Peterman | 312/201 |
| 4,708,411 | 11/1987 | Peterman | 312/201 |
| 5,350,270 | 9/1994 | Stallard et al. | 211/151 X |
| 5,476,180 | 12/1995 | Konstant | 211/151 |
| 5,598,934 | 2/1997 | Krummell et al. | 211/151 |

*Primary Examiner*—Robert W. Gibson, Jr.
*Attorney, Agent, or Firm*—Niro, Scavone, Haller & Niro

[57] ABSTRACT

The present invention is generally directed to improved advance or release means and mechanisms for use with cart, pallet, slip sheet or unit load storage systems, including flow rack and transfer and return systems.

23 Claims, 6 Drawing Sheets

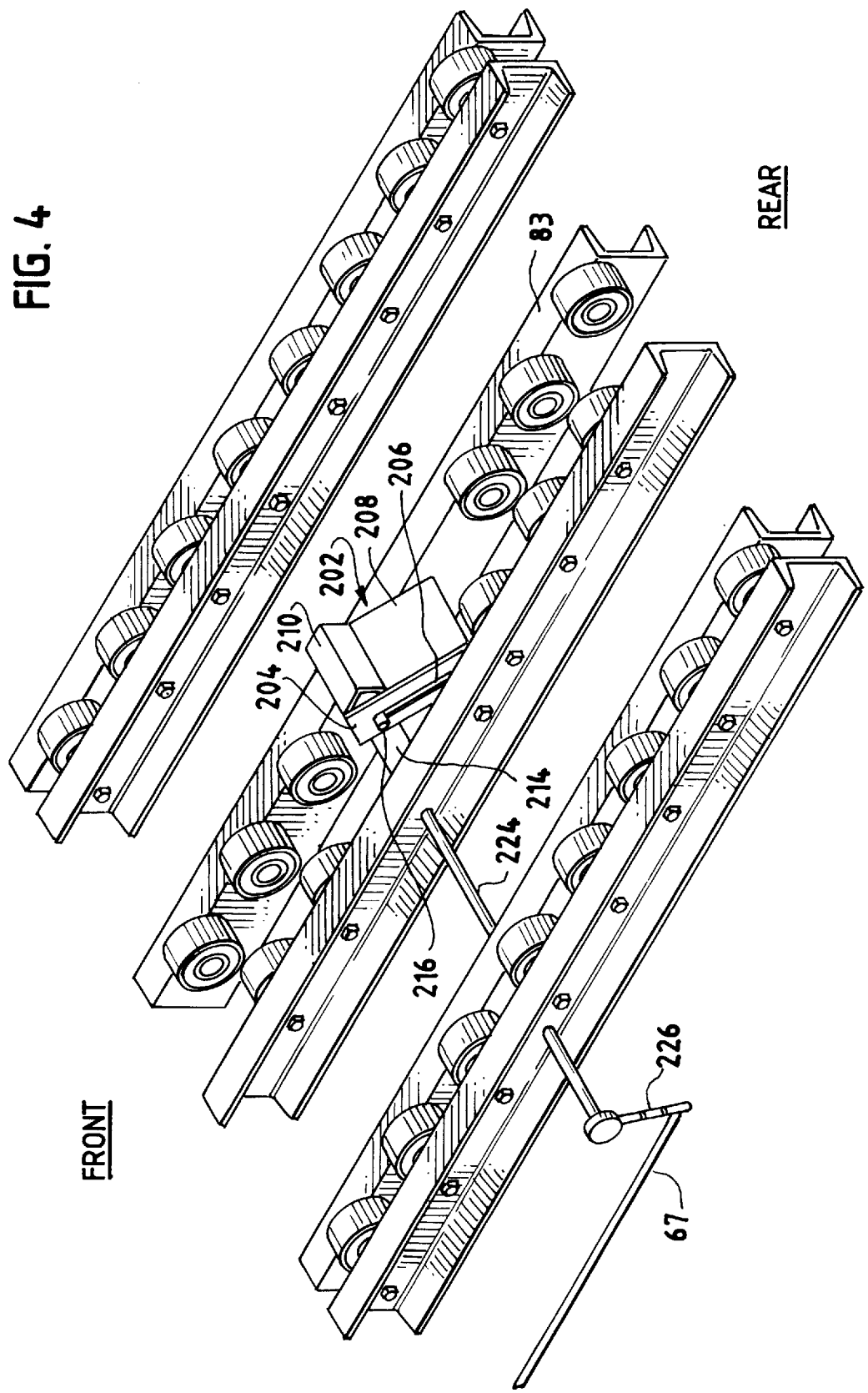

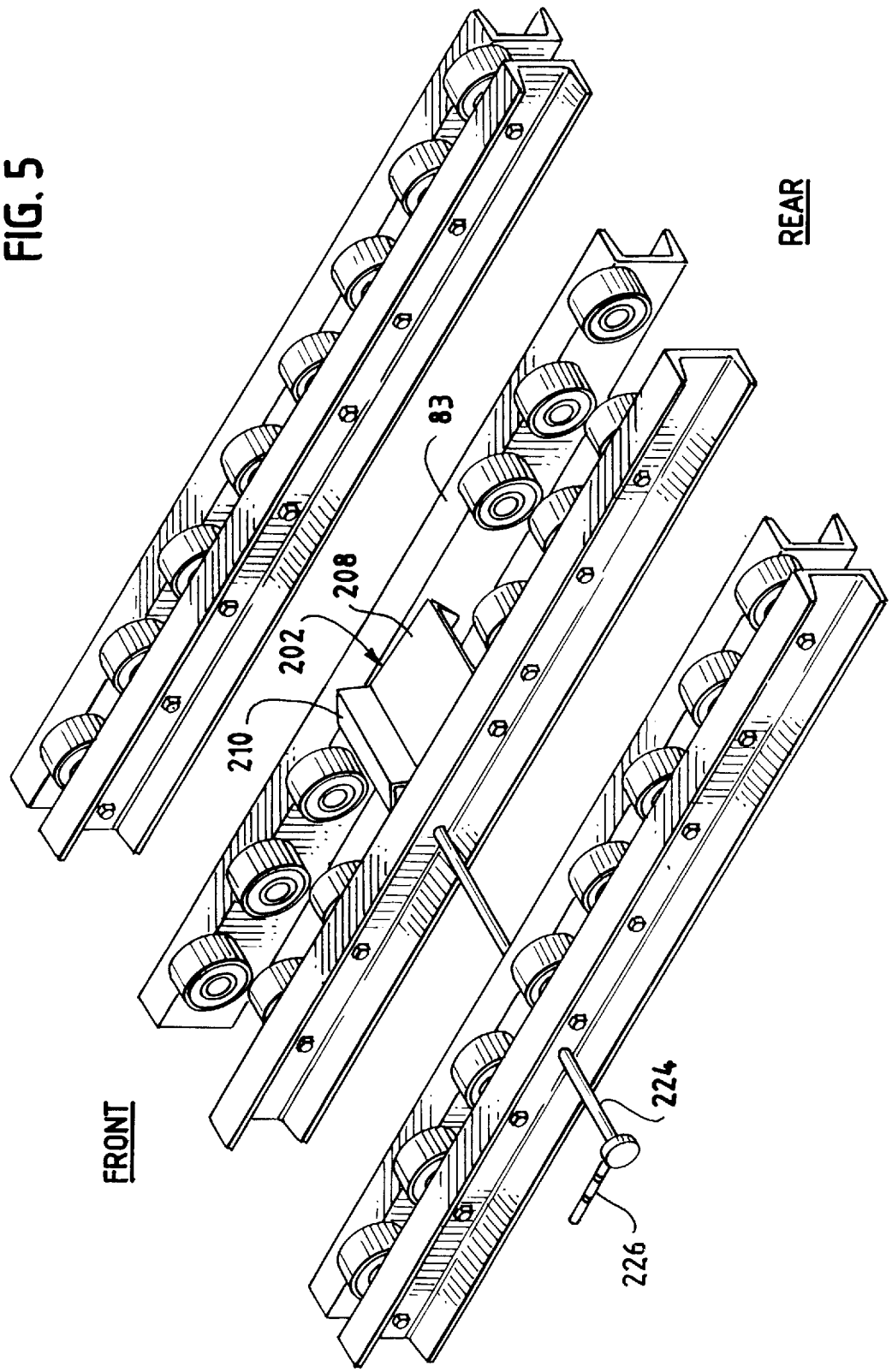

RELEASE MECHANISM FOR CARTS, PALLETS OR UNIT LOAD STORAGE SYSTEMS

BACKGROUND OF THE INVENTION

The present invention relates generally to cart or pallet storage systems and more particularly, to improved release mechanisms for use with cart, pallet, slip sheet or unit load flow rail storage systems, including transfer and return systems.

Various load transfer and return systems having multi-level rails are now known and are becoming accepted in the storage and warehouse industry. Examples of such systems are disclosed in U.S. Pat. No. 5,170,896, issued Dec. 15, 1992 to Anthony N. Konstant, and U.S. Pat. No. 5,617,961, issued Apr. 8, 1997 to Anthony N. Konstant and John F. Pater, both of which are assigned to Konstant Products, Inc. (hereinafter referred to as the "Konstant '896 patent" and "Konstant '961 patent," respectively, and incorporated herein by reference).

The Konstant '896 patent teaches, among other things, multi-level rail systems including cart return storage features that automatically and selectively permit the transfer of unloaded carts and/or unloaded carts and pallets from an unloading storage end (front) to a loading or return end (rear) where they may be conveniently stored or reused. These systems typically required specially designed carts and rails to permit selective transfer and the orderly flow of carts to the unloading and transfer end.

The Konstant '961 patent teaches, among other things, cart, pallet, slip sheet and/or unit load transfer and return storage systems that selectively and efficiently transfer unloaded carts, unloaded carts and pallets or unloaded pallets and the like from a storage position to a position where they may be reloaded, replaced or re-used. These systems generally provide for the transfer of a cart or pallet from an unloading position (front) on the feed or feed flow rails to a reloading position (rear) on the return or return flow rails without the need of an operator to physically remove the unloaded cart or pallet until it is in position to be reloaded. Such systems also provide for cart or pallet advance or release means for stopping the flow of loaded pallets or carts on the feed or feed flow rails to facilitate the loading, unloading and transfer processes.

In the transfer and return systems of the Konstant '961 patent, the cart advance release assembly includes a cross member having protrusions which extend upward into the path of the cart or pallet that is on the feed or feed flow rails in order to stop the cart or pallet prior to the transfer position. The structural members of the carts for use in such systems are typically provided with notches designed to cooperate with the cart release mechanism to prevent the undesired advance of carts to the transfer station/position while selectively permitting the advance of the carts or pallets upon activation. In such systems using pallets, the pallets typically have to be oriented in a certain way so and be of a certain condition that they may clear the protrusion of the spring biased release assembly upon their advancement down the feed flow rails.

Some users of such systems may desire potentially smoother, simpler or more effective operation of the cart or pallet release mechanism for use on these and other storage systems. Other users may desire the ability to use such systems without the need for specially designed carts or pallets to cooperate with the release assembly. Still others in the industry may desire an improved cart, pallet, slip sheet or unit load release assembly for use on various standard (typically single level) rail or flow rail storage systems.

SUMMARY OF THE INVENTION

The present invention preserves the advantages and benefits of pushback rack and other pallet rack storage and feed systems, such as the transfer and return systems described in the Konstant '896 and Konstant '961 patents. In addition, the present invention provides new advantages and benefits over these and other known systems.

Therefore, the object of the present invention is to provide a smooth and simple cart, pallet, slip sheet or unit load (hereinafter referred to as "cart" or "pallet") release or advance mechanism without requiring specially designed carts, pallets and the like.

Another object of the present invention is to provide a smooth, effective and simple cart or pallet release mechanism to allow the selective release and advance of carts or pallets for storage, transfer and/or return.

An additional object of the present invention is to provide for reduced installation and manufacturing time and cost.

A further object of the present invention is to provide an improved cart or pallet release means or mechanism that may be used with standard, typically single level rail storage systems having flow rails or carts and rails.

In accordance with the present invention as applied to a transfer and return storage system, an improved cart or pallet release assembly is provided having an engagement bracket pivotably mounted at its lower end to the rails or flow rails at a desired position along the feed or feed flow rails to engage and stop the continued advancement of the cart or pallet. In a preferred embodiment, the engagement bracket is also provided with at least one with elongated slot on its side. Also included is a front bracket pivotably mounted at its lower end to the feed or feed flow rails spaced forward of the engagement bracket. At its upper end, the front bracket is provided with a guide pin, which is designed to slidably cooperate with the elongated slots of the engagement bracket. In a preferred embodiment of the present invention, the engagement and rear brackets are pivotably mounted and spaced at their lower end along the rails, such that the engagement bracket and front bracket form a right isosceles triangle which protrudes into the rail system to stop the advance of carts or pallets when in the uppermost or stop position. A bias spring is included to automatically urge the front and engagement brackets into the stop position. In addition, a torsion rod or other rotational means is attached at one end to the lower end of the front bracket at its pivot point such that when the torsion rod is rotated, the upper end of the front bracket rotates downward. Upon rotation, the guide pin of the front bracket then rotates the engagement bracket downward on top of the front bracket into its (lower) cart or pallet advance position.

An operation lever is provided on the free end of the torsion rod, to which a release rod may be hinged such that when the release rod is pulled, the operation lever and the torsion rod are rotated, causing the release assembly to assume its lowered or release position. In preferred embodiments of the present invention, the engagement and rear brackets are pivotably mounted along the rails or between a row of feed flow rails such that the brackets are perpendicular to one another when in the uppermost or stop position, whereby the force of a cart or pallet is favorably distributed on the one or more brackets, enabling easy activation of the release mechanism. A stop plate may also be provided on the engagement bracket to aid in engaging the carts or pallets in the stop position.

BRIEF DESCRIPTION OF THE DRAWINGS

These and other features, objects and advantages of the present invention will become apparent from the following description and drawings wherein like reference numerals represent like elements in the several views. For ease of understanding, the reference numerals used to identify the components of the transfer and return systems, and particularly the flow rail systems, described in the Konstant '961 patent, to the extent not changed as a result of application of the present invention, will be used herein.

FIG. 4 is a side perspective view of an embodiment of the present invention in the stop position.

FIG. 5 is a side perspective view of an embodiment of the present invention shown in a released or flow position.

DETAILED DESCRIPTION OF THE PREFERRED EMBODIMENT

Figure 1:
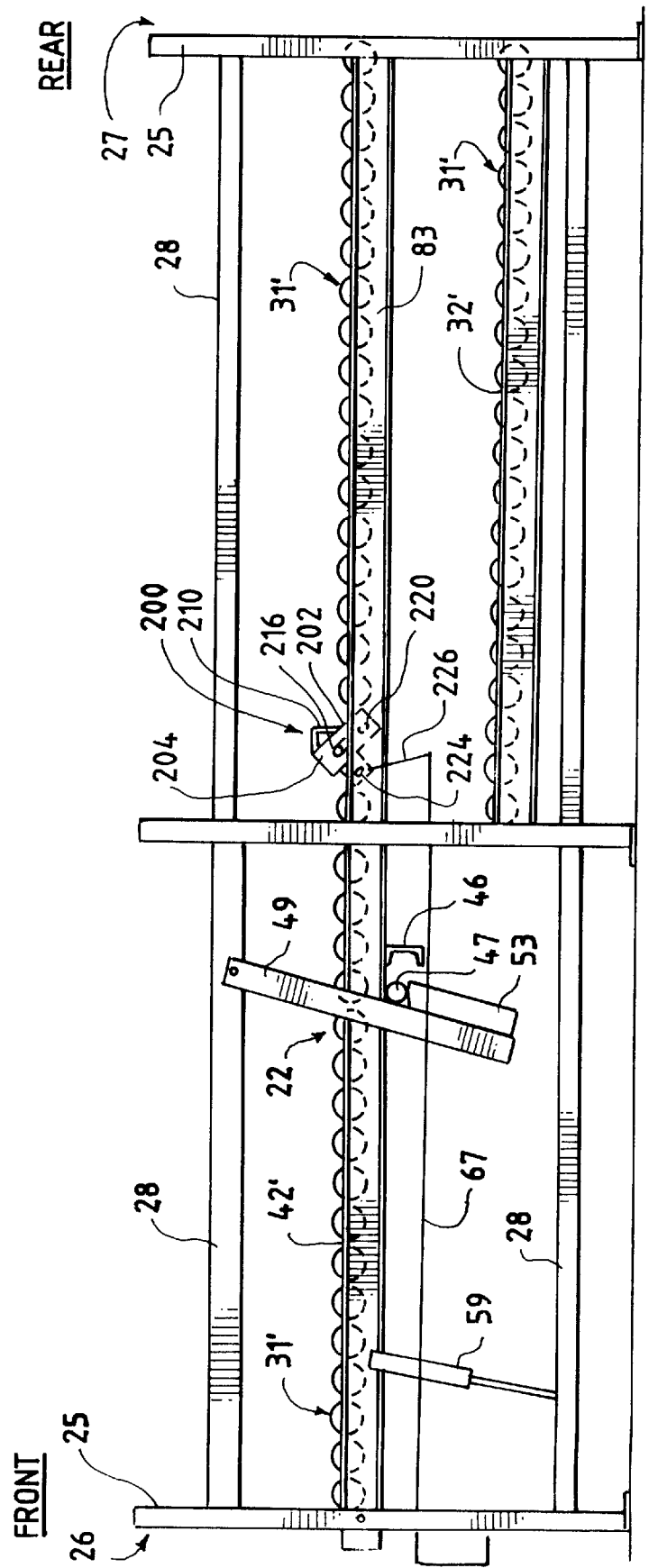
FIG. 1 is a side elevational view of an embodiment of the present invention incorporated in a flow rail transfer and return system shown and described in the Konstant '961 patent.
Figure 2:
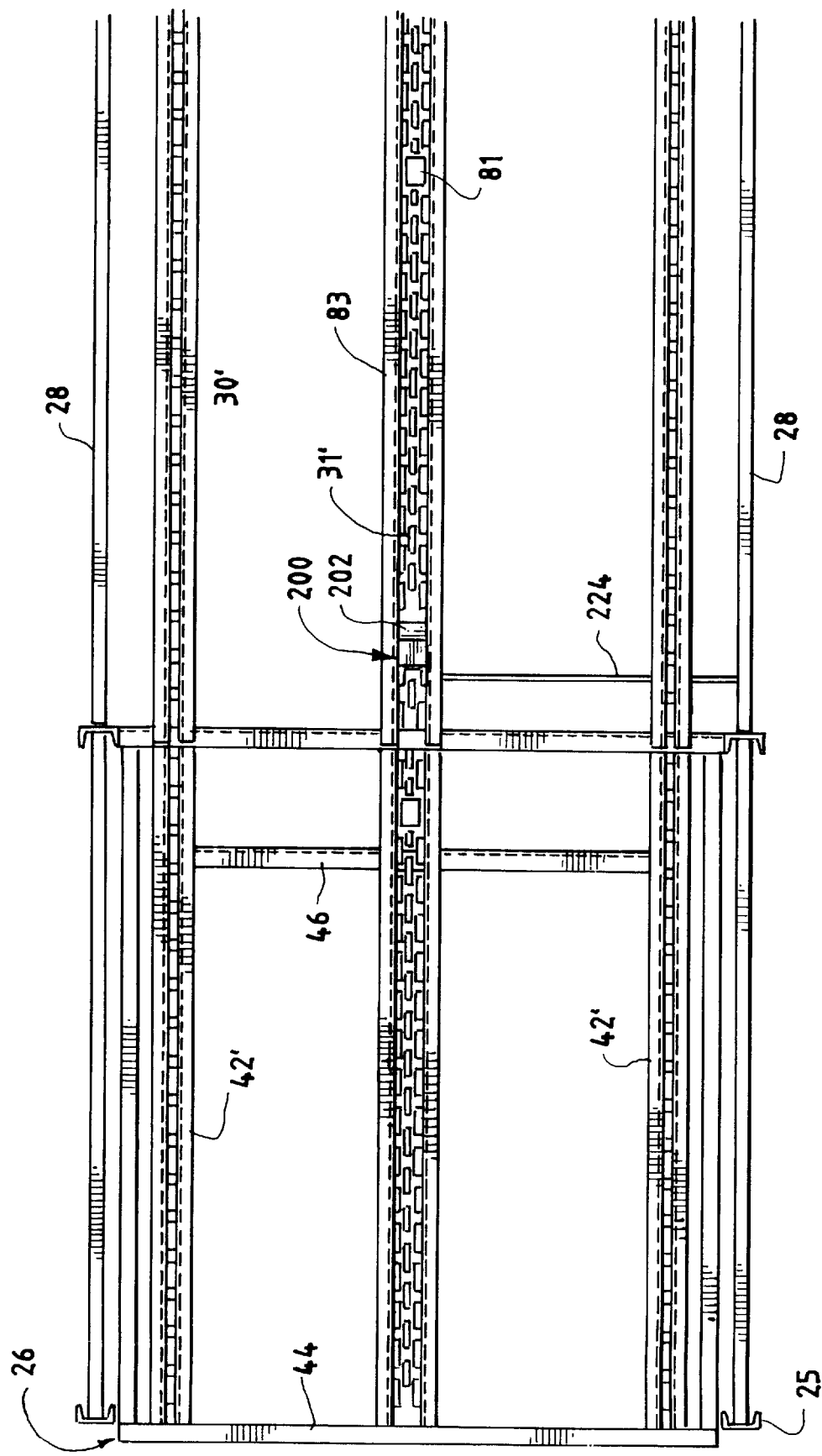
FIG. 2 is a top plan view of an embodiment of the present invention of FIG. 1.

A typical pallet transfer and return system, in which the present invention may be incorporated, is shown generally in FIGS. 1 and 2. The components and operation of, among other things, the pallet transfer and return system are described in detail in the Konstant '961 patent. For ease of understanding, embodiments of the present invention will be described in relation to the flow rail version of the transfer and return system of the Konstant '961 patent. However, it will be understood by those of ordinary skill in the art that the present invention in its various forms may be readily incorporated on other transfer and return storage systems, such as those using carts, pallets, unit loads or slip sheets, as well as standard and flow rail-type storage systems.

A preferred embodiment of the cart or pallet release or advance mechanism of the present invention is shown generally as 200. Release means 200 consists of an engagement bracket 202, which may be constructed from metal plates or other suitable members. A pair of side members 204 (one shown), both of said members having an elongated slot 206, are also provided. The side members 204 are interconnected by a face plate 208, which may be further provided with a cart or pallet stop plate 210. Selection of the size and strength of the members used to construct the engagement bracket 202, as well as the other components of the release means 200, will be understood by those of ordinary skill in the art, depending upon the design loads, type of system and the particular application.

A front bracket 212 is also provided having two side members 214 (one shown) and a brace plate 215 (shown in phantom in FIG. 3) interconnecting the side members 214. Front bracket 212 is designed to nest within engagement bracket 202 and is provided with a guide pin 216, which interconnects side members 214 and 204. The guide pin is designed to slidingly cooperate with elongated slot 206 of engagement bracket 202.

Figure 3:
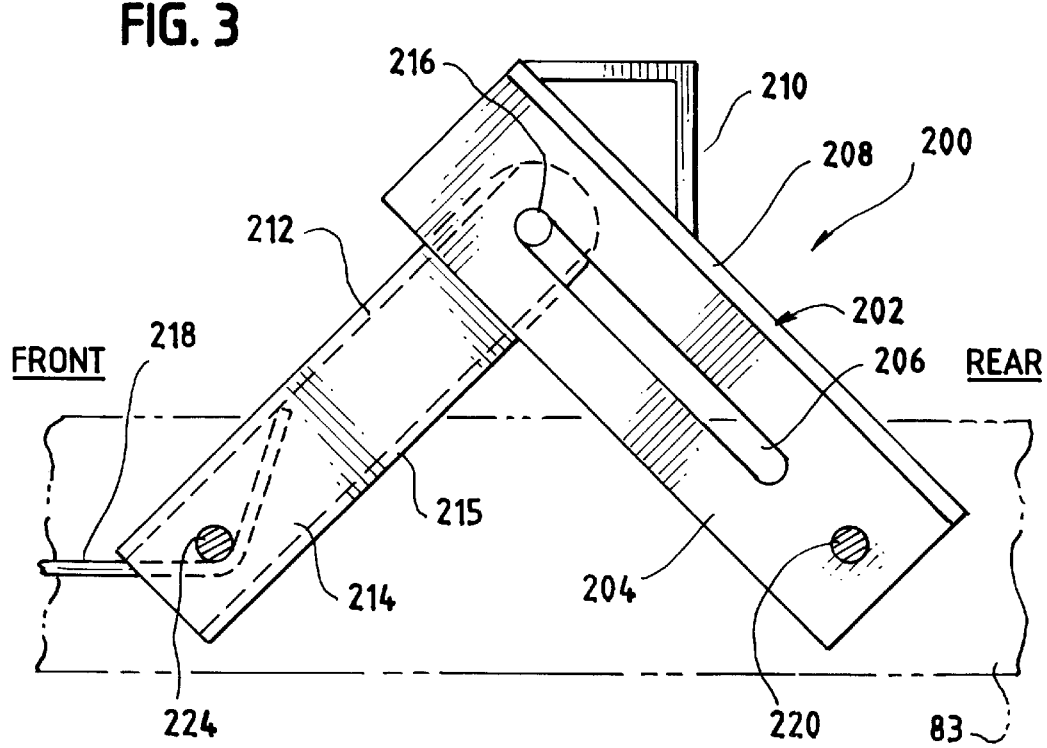
FIG. 3 is a side elevational view of components of an embodiment of the present invention.

As better shown in FIGS. 3, 4 and 5, engagement bracket 202 is pivotably mounted at its lower end to feed flow rails 83 by pivot pins 220 (one shown) or other suitable pivot. Pivot pin 220 is fixed with respect to engagement bracket 202, but pivots (rotates) with respect to flow rail 83. It will be understood by those of skill in the art that pivot pin 220 may be pivotably mounted to flow rails 83 by a mounting bracket (not shown), through holes, bearings and the like in flow rails 83, or by other suitable and well-known means.

In a preferred embodiment of the present invention, the lower end of front bracket 212 is welded or otherwise fixed to one end of a torsion rod 224. When configured in this manner, torsion rod 224 acts as a pivot pin (or rotation point) for the front bracket 212, like that of pivot pin 220 on the engagement bracket 202. Torsion rod 224 then extends through an aperture in flow rail 83 to one side of the rail system (as shown in FIG. 2). Torsion rod 224 terminates at its other end with a lever 226. Alternatively, a release rod 67 may be provided that is hinged at one end to lever 226 and which terminates at its other end in the aisle or front end of the storage and return system for convenient operation. Again, it will be understood by those of skill in the art that a pin or other pivot may be provided at the lower end of the front bracket 212 along with a separate torsion rod 224, or other component or rotational means suitable to operate the release mechanism 200 or means of the present invention. For example, wire rope and pulleys or push sticks may be used to effect the proper rotation and activation of the invention.

The present invention may better be understood by reference to its operation and to FIGS. 1, 2, 4 and 5. In operation, a loaded pallet (not shown) is placed on feed flow rails 30' and 83, which rolls down the feed flow rails 30' and 83 until the leading edge of the pallet comes in contact with face plate 208 and the stop plate 210 of engagement bracket 202, thereby stopping the flow of the loaded pallet (not shown). When desired, such as when the pallet is unloaded, release rod 67 is pulled forward, which in turn rotates the lever 226 and torsion rod 224 in a clockwise direction in reference to the right side of the system when viewed from the front or unloading end of the system, as shown in the Figures.

As torsion rod 224 rotates, front bracket 212 rotates downward. Because guide pins 216 are slidably engaged in and cooperate with elongated slot 206 of engagement bracket 202, as front bracket 212 rotates downward, engagement bracket 202 also rotates downward and nests above or atop front bracket 212 into a pallet or cart release or advance position (see FIG. 5). After the pallet advances forward past the components of the release mechanism 200, torsion rod 224 is rotated in a counter-clockwise direction by bias spring 218 (FIG. 3), thereby rotating front bracket 212 and engagement bracket 202 into the upper or stopped position (see FIG. 4) ready to stop the advancement of a subsequent pallet or cart.

Figure 3A:
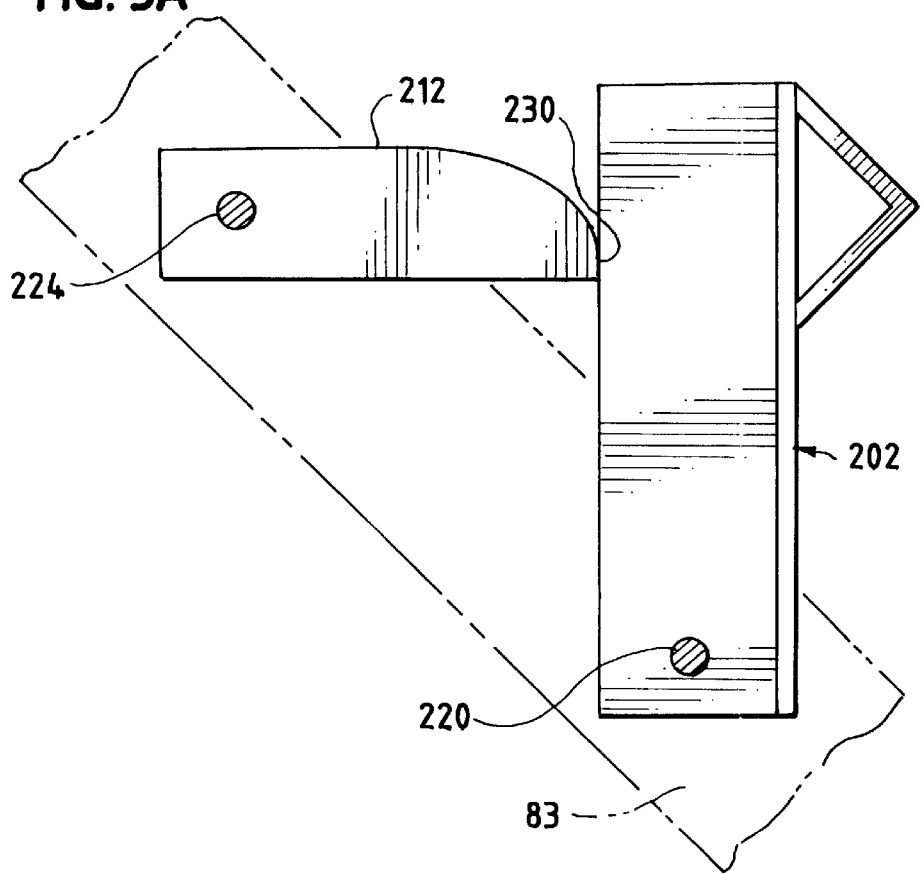
FIG. 3A is a side elevational view of the components of an alternative embodiment of the present invention.

An alternative embodiment of the release mechanism 200 of the present invention is shown in FIG. 3A. In this embodiment, engagement bracket 202 and front bracket 212 are constructed from rectangular, tubular members. The free or upper end of the front bracket 212 is provided with a quarter-circle notch cut along its sides and top as shown in FIG. 3A, whereby a cavity is formed in the end of the front bracket 212 such that a sufficient portion of the free end of engagement bracket 202 may nest within front bracket 212 when the assembly is rotated into the release position as herein described. In the stop position, front bracket 212 contacts engagement bracket 202 along line or point 230.

Yet other embodiments of the release mechanism 200 will be apparent to those of ordinary skill in the art. In its preferred form, the angle formed between a line through pivot point 224 and point 230 and a line through point 220 and 230 is equal to 90° to aid in the even distribution of forces as discussed below.

Figure 6:
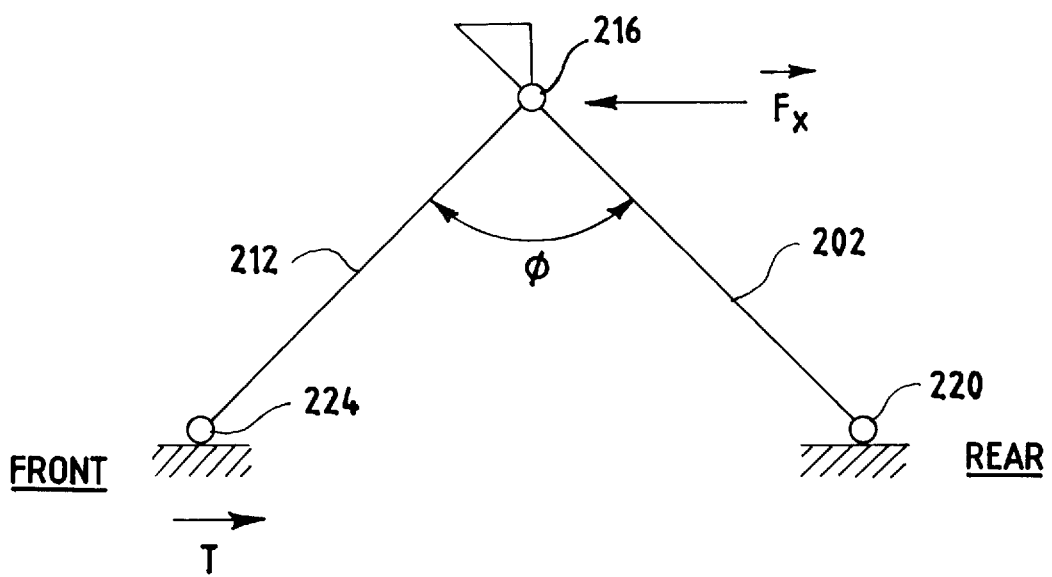
FIG. 6 is a line drawing of the force vectors and torsion requirements of a preferred embodiment of the present invention.

It should be noted that in preferred embodiments of the present invention, a 90° angle is formed between a line through torsion rod 224 and guide pin 216, and pivot pin 220 and guide pin 216. By aligning the components in a right angle, the forces of the loaded pallet on the release mechanism 200 is evenly spread between the engagement bracket 202 and rear bracket 212. This equal distribution of forces permits easier activation of the mechanism 200, while at the same time securely restraining the loaded pallet from advancing. With specific reference to FIG. 6, T equals the torque required, including friction forces, to rotate torsion rod 224. F is the force of the loaded cart or pallet. If angel θ is less than 90°, T is high, making activation difficult. If angle θ is greater than 90°, $F_x$ may be strong enough to collapse the components. However, as in the preferred embodiment, when angel θ equals 90°, F is a pure axial load and no force from line pressure is added to T. This provides secure stopping with relative ease of release.

It will be understood by those of skill in the art that the present invention may be incorporated on a wide variety of storage systems, including standard flow-type rack structures. It will also be understood that the release mechanism may be made of a variety of materials and configurations. Thus, while preferred embodiments have been illustrated and described, it will be understood by those of ordinary skill in the art that changes and other modifications can be made without departing from the invention in its broader aspects. Various features of the present invention are set forth in the following claims.

What is claimed is:

1. An improved release mechanism for flow rack and load transfer and return systems having at least one feed flow rail with rolling surfaces to accommodate pallets, slip sheets and unit loads, the improvement comprising:
   an engagement bracket to engage the load and stop its further advancement along the feed flow rail, the engagement bracket pivotably mounted at its lower end to the feed flow rail and including elongated slots along its sides;
   a front bracket having a guide pin at its upper end and pivotably mounted at its lower end to the feed flow rail spaced forward of the engagement bracket;
   a guide pin affixed to the sides of the upper end of the front bracket capable of slidable engagement with said elongated slots of said engagement bracket; and,
   a rotational means for selectively causing the downward rotation of the front bracket, the guide pin of which in turn causes the downward rotation of the engagement bracket to assume a load release position.

2. The invention of claim 1 wherein the rotational means includes a torsion rod secured to said front bracket at said pivotable mount.

3. The invention of claim 2 wherein the torsion rod further includes a lever at its other end and a release rod hinged to said lever such that when said release rod is pulled forward, the torsion rod is rotated.

4. The invention of claim 1 wherein the engagement bracket includes a stop plate to engage a load when in a stopped position.

5. The invention of claim 1 wherein a means to bias the release mechanism into the stop position is provided.

6. The invention of claim 3 wherein the engagement bracket, front bracket and feed flow rail portion between their respective pivot points thereon form a right isosceles triangle.

7. The invention of claim 1 wherein the engagement bracket, front bracket and feed flow rail portion between their respective pivot points thereon form a right isosceles triangle.

8. An improved release mechanism for multi-level load transfer and return systems having at least one feed flow rail with rolling surfaces to accommodate at least one wheeled cart, the improvement comprising:
   an engagement bracket to engage the cart and stop its further advancement along the feed rail, the engagement bracket pivotably mounted at its lower end to the feed rail and including elongated slots along its sides;
   a front bracket having a guide pin at its upper end and pivotably mounted at its lower end to the feed rail spaced forward of the engagement bracket;
   a guide pin affixed to the sides of the upper end of the front bracket capable of slidable engagement with said elongated slots of said engagement bracket;
   a rotational means for selectively causing the downward rotation of the front bracket, the guide pin of which in turn causes the downward rotation of the engagement bracket to assume a cart release position.

9. The invention of claim 8 wherein a means to bias the release mechanism into the stop position is provided.

10. The invention of claim 8 wherein the rotational means includes a torsion rod secured to said front bracket at said pivotable mount to said feed rails.

11. The invention of claim 10 wherein the torsion rod further includes a lever at its other end and a release rod hinged to the lever such that when said release rod is pulled forward, the torsion rod is rotated.

12. The invention of claim 1 wherein the engagement bracket includes a stop plate to engage the cart when in a stopped position.

13. The invention of claim 11 wherein the engagement bracket, front bracket and feed rail portion between their respective pivot points thereon form a right isosceles triangle.

14. The invention of claim 8 wherein the engagement bracket, front bracket and feed rail portion between their respective pivot points thereon form a right isosceles triangle.

15. An improved release mechanism for flow rack and load transfer and return systems having at least one feed flow rail with rolling surfaces to accommodate pallets, slip sheets and unit loads, the improvement comprising:
   an engagement bracket to engage a load and stop its further advancement along the feed flow rail, the engagement bracket pivotably mounted at its lower end to the feed flow rail and including elongated slots along its sides;
   a stop plate on the engagement bracket to engage the load when in the stop position;
   a front bracket having a guide pin at its upper end and pivotably mounted at its lower end to the feed flow rail spaced forward of the engagement bracket;
   a guide pin affixed to the sides of the upper end of the front bracket capable of slidable engagement with said elongated slots of said engagement bracket; and,
   a rotational means for selectively causing the downward rotation of the front bracket, the guide pin of which in turn causes the downward rotation of the engagement bracket to assume a release position.

16. The invention of claim 15 wherein the rotational means includes a torsion rod secured to said front bracket at said pivotable mount and a lever at the other end of the torsion rod and a release rod hinged to the lever such that when said release rod is pulled forward, the torsion rod is rotated.

17. The invention of claim 16 wherein the engagement bracket, front bracket and feed flow rail portion between their respective pivot points thereon form a right isosceles triangle.

18. The invention of claim 15 wherein the engagement bracket, front bracket and feed flow rail portion between their respective pivot points thereon form a right isosceles triangle.

19. The invention of claim 16 wherein a bias means is provided to bias the release mechanism into the stop position.

20. The invention of claim 19 wherein the bias means further includes a spring.

21. An improved release mechanism for flow rack and load transfer and return systems having at least one feed flow rail with rolling surfaces to accommodate pallets, slip sheets and unit loads, the improvement comprising:

an engagement bracket to engage a load and stop its further advancement along the feed flow rail, the engagement bracket pivotably mounted at its lower end to the feed flow rail;

a front bracket pivotably mounted at its lower end to the feed flow rail spaced forward of the engagement bracket; and a rotational means for selectively causing the downward rotation of the front bracket and the downward rotation of the engagement bracket in order to assume a release position.

22. The invention of claim 21 wherein the engagement bracket, front bracket and feed flow rail portion between their respective pivot points thereon form a right isosceles triangle.

23. The invention of claim 21 wherein a bias means is provided to bias the release mechanism into the stop position.

* * * * *